United States Patent [19]

Thompson et al.

[11] 3,980,761

[45] Sept. 14, 1976

[54] PRODUCTION OF FINELY DIVIDED, LOW DEFECT, STOICHIOMETRIC TITANIUM DISULFIDE

[75] Inventors: Arthur H. Thompson; Fred R. Gamble, both of New Providence, N.J.

[73] Assignee: Exxon Research and Engineering Company, Linden, N.J.

[22] Filed: May 9, 1975

[21] Appl. No.: 575,999

[52] U.S. Cl. .................... 423/565; 423/561; 429/218

[51] Int. Cl.² .................... C01G 23/00

[58] Field of Search .................... 423/561, 562, 565; 136/20

[56] References Cited

UNITED STATES PATENTS

| | | | |
|---|---|---|---|
| 3,079,229 | 2/1963 | Garrett et al. | 423/562 |
| 3,519,492 | 7/1970 | Huml | 423/565 |
| 3,726,643 | 4/1973 | Merzhanov | 423/561 |

OTHER PUBLICATIONS

Australian Journal of Chemistry, vol. 11, 1958, pp. 445–484, The sulfites Selenides & Tellurides of Ti Zr Ht & Th Parts I–IV McTaggart et al., pp. 459–470 Furnished (Part II).

Annles de Chimie Series 13 vol. 7, 1962 pp. 57–83 Contribution A'Etude Cristallochimique du Systeme Titane–Soufe, Jeanniw, pp. 57–63 Furnished (Intro & Part I).

*Primary Examiner*—Oscar R. Vertiz
*Assistant Examiner*—Gary P. Straub
*Attorney, Agent, or Firm*—Michael A. Ciomek

[57] ABSTRACT

Finely divided, stoichiometric titanium disulfide is prepared by directly reacting metallic titanium with less than stoichiometric amounts of elemental sulfur at a temperature between about 400° and 1,000°C. to form finely divided, nonstoichiometric, titanium-rich titanium disulfide. The titanium-rich titanium disulfide is then annealed at a temperature between about 400° and about 600°C. in an atmosphere having a sulfur partial pressure approximately equal to the sulfur partial pressure of stoichiometric titanium disulfide whereby the sulfur in the atmosphere reacts with the titanium-rich titanium disulfide to form a finely divided, stoichiometric titanium disulfide.

11 Claims, No Drawings

PRODUCTION OF FINELY DIVIDED, LOW DEFECT, STOICHIOMETRIC TITANIUM DISULFIDE

BACKGROUND OF THE INVENTION

The present invention relates to the production of finely divided, stoichiometric titanium disulfide and more particularly to a process for directly reacting metallic titanium with elemental sulfur to form finely divided, stoichiometric titanium disulfide.

Stoichiometric titanium disulfide has a lamelliform structure in which each lamella is a hexagonal layer of titanium metal surrounded on either side by a layer of sulfur atoms, and the lamella are bound to each other by weak van der Waals forces. The individual lamella being held together merely by van der Waals forces can be readily intercalated by ions and molecules. The ease with which titanium disulfide can be intercalated makes it a material that has great potential as a cathode material in secondary batteries because the rapid rate of intercalation will permit rapid discharge at battery cathodes.

The rate at which titanium disulfide can be intercalated is adversely affected by non-stoichiometry, particularly if titanium disulfide is titanium-rich, because the excess titanium is found between the individual lamella where it interferes with the mobility of the intercalating species. The particle size of the titanium disulfide also has an effect on the rate of intercalation. The rate of intercalation is greater in stoichiometric titanium disulfide having a finer particle size because the finer crystallites expose far greater areas of inter-lamella spacings into which the intercalating species can enter the crystallites and the lengths of intra-crystalline diffusion paths are significantly reduced. Thus, if titanium disulfide is to be used as a cathode material in secondary batteries, it is advantageously stoichiometric and finely divided.

Titanium disulfide has been prepared by at least three methods. Titanium halides have been reacted with hydrogen sulfide to form titanium disulfide, but this method has the disadvantage that the titanium disulfide is contaminated with the halide species which can interfere with intercalation. Somewhat related to the previous method is the halide transport method in which titanium metal, elemental sulfur and small amounts of a halide, preferably iodide or bromine, are added to a reaction vessel which is evacuated, sealed and then differentially heated to produce titanium disulfide. The halide transport method has the disadvantage of contaminating the titanium disulfide with the halide transport species and of producing titanium disulfide having larger than desired crystallites. Titanium disulfide has also been prepared by directly reacting titanium metal with elemental sulfur by heating the reactants to a reaction temperature, for example about 800°C., and holding for long periods of time to insure substantially complete reaction between the titanium and the elemental sulfur.

SUMMARY OF THE INVENTION

Generally speaking, the present invention relates to the production of finely divided, stoichiometric titanium disulfide by incrementally reacting metallic titanium with elemental sulfur under controlled conditions. Metallic titanium is heated to a temperature between about 400°C. and 1,000°C. and is contacted with less than stoichiometric amounts of elemental sulfur to form finely divided, titanium-rich, non-stoichiometric titanium disulfide. The non-stoichiometric titanium disulfide is then annealed at a temperature between about 400° and 600°C. in an atmosphere having a sulfur partial pressure approximately equal to the equilibrium sulfur partial pressure above titanium disulfide whereby sulfur in the atmosphere reacts with the non-stoichiometric titanium disulfide to form finely divided, stoichiometric titanium disulfide.

DETAILED DESCRIPTION OF THE INVENTION

Finely divided stoichiometric titanium disulfide is prepared in at least a two-stage reaction in which finely divided titanium-rich, non-stoichiometric titanium disulfide is initially formed and then the sulfur content of the non-stoichiometric titanium disulfide is adjusted to make it stoichiometric without affecting the morphology of the non-stoichiometric material. Conducting the reaction in at least two stages is an important feature of the present invention. It has been found that titanium-rich, non-stoichiometric titanium disulfide forms smaller crystallites than stoichiometric titanium disulfide and that the titanium-rich, non-stoichiometric titanium disulfide can be subsequently annealed in a sulfur-containing atmosphere to form stoichiometric titanium disulfide without encountering significant crystal growth.

The form of the metallic titanium is not an important feature insofar as it relates to the properties of the final product. However, from the standpoint of rates of reaction and completeness of reaction, discrete forms of titanium are advantageously employed as feed materials. Titanium wire or titanium sponge are examples of the forms of titanium that can be employed. The titanium should not be so fine that the reaction becomes explosive and/or that the feed material in the final product becomes unduly contaminated by surface oxidation, etc. Best results in terms of reaction rates and product purity are obtained by using titanium wire, titanium sponge or titanium sheet.

In carrying the present invention into practice, metallic titanium is heated to a temperature between about 400° and about 1000°C. and is contacted with elemental sulfur in an amount between about 80 and 95% of the stoichiometric amount required to form titanium disulfide to produce finely divided, titanium-rich non-stoichiometric titanium disulfide. Both the temperature to which the metallic titanium is initially heated and the amount of sulfur employed are important features of the present invention. When the first stage reaction is conducted at temperatures below about 450°C., the reaction proceeds too slowly. At temperatures in excess of about 800°C., increasing amounts of crystal defects are introduced into the reaction products, which defects destroy some of the desirable characteristics of titanium disulfide as a battery material and the defects are difficult to eliminate during subsequent annealing operations. Advantageously, the first stage reaction is conducted at a temperature between about 500° and 700°C. in order that the reaction may be conducted at commercially attractive rates while producing a product that has desirable characteristics when used as a battery material.

The amount of sulfur employed is also an important feature of the present invention. Sufficient sulfur should be used in the first stage reaction to insure the production of $Ti_xS_2$ wherein $x$ is greater than about 1.05 and less than 1.25, which product has an average particle size that makes it preferable as a battery material and contains sufficient amounts of sulfur that the annealing operation does not have to be conducted for uneconomically long periods of time. If excessive amounts of sulfur are present during the first stage of the reaction, large crystals of titanium disulfide will be formed and will not be altered during subsequent annealing operations.

After the first stage reaction has been completed, the finely divided, titanium-rich, non-stoichiometric titanium disulfide is then annealed at a temperature between about 400° and 600°C. in an atmosphere having a sulfur partial pressure substantially equal to the sulfur partial pressure of titanium disulfide at the annealing temperature to form finely divided, stoichiometric titanium disulfide. If atmospheres having sulfur partial pressures less than the foregoing amount are employed, either the rate of production of stoichiometric titanium disulfide is materially lowered or stoichiometric titanium disulfide is not formed. When atmospheres having sulfur partial pressures exceeding the foregoing range are employed, titanium trisulfide can be formed. The production of titanium trisulfide should be minimized because it does not have the desirable properties that titanium disulfide has and the reaction products must be treated to decompose any titanium trisulfide or alternatively to remove that titanium trisulfide that has been formed.

Titanium disulfide produced in accordance with the process of the present invention is stoichiometric, i.e. it can be represented by the formula $Ti_yS_2$ where y is a number that has a value between about 1.00 and 1.02, advantageously between about 1.00 and 1.01. Not only is the titanium disulfide stoichiometric, but it also has a controlled particle size distribution of about 100% less than about 2 microns and about 100% greater than about 0.1 microns. Both the composition and the particle size distribution of the titanium disulfide make it a highly preferred material for use in secondary battery cathodes.

The reaction between metallic titanium and elemental sulfur can be conducted on a batch basis. Metallic titanium and either less than stoichiometric amounts of elemental sulfur or substantially stoichiometric amounts of elemental sulfur are placed in a reaction vessel, and the reaction vessel is evacuated and sealed. When less than stoichiometric amounts of elemental sulfur are employed, the reaction vessel is heated uniformly at a rate between about 10°C. per hour and 100°C. per hour to minimize explosive reaction rates. The reaction temperature will advantageously be between about 450° and 800°C. When the initial reaction is complete, i.e. when the titanium-rich titanium disulfide corresponding to $Ti_xS_2$ where $x$ has a value between about 1.05 and 1.25 has been formed, the temperature of the reaction vessel is rapidly decreased by removing it from the heated zone. The second stage of the reaction is then completed by opening the reaction vessel and adding additional elemental sulfur so that the total constituents in the vessel, $Ti_xS_2$ and S, have the nominal composition of $TiS_2$. The vessel is then resealed and heated at a rate between about 100° per hour and 500°C. per hour to the annealing temperature. The annealing temperature is advantageously between about 400° and 600°C. The annealing reaction continues until the $TiS_2$ product is obtained.

The reaction between titanium metal and substantially stoichiometric amounts of elemental sulfur is conducted by placing the stoichiometric ratio of the elements in a reaction vessel and the reaction vessel is evacuated and sealed. The sealed vessel is then differentially heated to establish a hot zone in which titanium is located and a cooler zone. The hot zone is heated to the reaction temperature between about 450° and 800°C. and the cool zone is maintained at a temperature between about 100° and 300°C. The temperature in the cool zone controls the sulfur partial pressure in the entire reaction vessel which partial pressure, in turn, controls the rate and the completeness of the reaction. Control of the rate of reaction is necessary to avoid explosive reaction rates and control of the completeness of the reaction is necessary to insure a final product of titanium-rich titanium disulfide with the desired particle size. When the initial reaction is complete, i.e. when the titanium-rich titanium disulfide corresponding to $Ti_xS_2$ where $x$ has a value between about 1.05 and 1.25 has been formed, the entire vessel is brought to an annealing temperature between about 400° and 600°C. At these annealing temperatures sulfur partial pressures substantially equal to the equilibrium sulfur partial pressure over titanium disulfide are established whereby the sulfur content of the non-stoichiometric titanium disulfide is adjusted to approach stoichiometry. The reaction is held at the annealing temperature long enough to insure substantially complete conversion of the non-stoichiometric titanium disulfide to stoichiometric titanium disulfide.

Although the process in accordance with the present invention has been described in terms of a batch process, those skilled in the art will recognize immediately that the process can be conducted on a continuous basis. For example, titanium metal is conveyed to the first reaction zone which is maintained at a temperature between about 450° and 800°C. and in which a sulfur partial pressure between about 0.01 and 0.1 atmosphere is maintained with the proviso that the sulfur partial pressure is substantially equal to the equilibrium sulfur partial pressure over the desired titanium-rich titanium disulfide at the temperature of the first zone. After the titanium metal has completely reacted with the elemental sulfur to form titanium-rich titanium disulfide, the titanium-rich material is conveyed to a second zone which is maintained at a temperature between about 450° and 600°C. and in which the sulfur partial pressure is maintained between about 0.1 and 0.75 atmosphere with the proviso that the sulfur partial pressure is substantially equal to the equilibrium sulfur partial pressure over titanium disulfide at the temperature at which the second reaction zone is maintained. When the titanium-rich titanium disulfide is completely reacted in the second reaction zone to produce stoichiometric titanium disulfide, the titanium disulfide is conveyed to a cooling zone in which an inert atmosphere is maintained.

In order to give those skilled in the art a better appreciation of the present invention, the following illustrative example is given:

EXAMPLE 1

1.043 grams of titanium wire with a diameter of 0.5 mm and 1.317 grams of sulfur powder (approximately 94.5% of the stoichiometric amount required for titanium disulfide) were sealed in a quartz tube 1 cm diameter and 10 cm long. This tube was placed in a uniform temperature zone where the temperature was raised to 750°C. in a time of 48 hours. The reaction was permitted to proceed for one week and then the furnace was shut off. The reaction tube was then opened and 0.0792 gram of sulfur was added to the first stage product of titanium-rich titanium disulfide which corresponded to $Ti_{1.06}S_2$ in a new tube, and the tube was sealed. The sealed tube was heated to 600°C. and held at that temperature for a week to adjust the sulfur content of the titanium-rich titanium disulfide. The product was golden yellow $TiS_2$ powder with a particle size distribution of about 100% less than about 2 microns and about 100% greater than about 0.1 microns as determined by scanning electron microscope studies.

What is claimed is:

1. A process for preparing finely divided, substantially stoichiometric titanium disulfide which comprises heating metallic titanium to a reaction temperature between about 400° and 1000°C., contacting the heated titanium with less than stoichiometric amounts of elemental sulfur to form finely divided titanium-rich, non-stoichiometric titanium disulfide which corresponds to the formula $Ti_xS_2$ wherein $x$ is a numerical value between about 1.05 and 1.25 and then annealing the titanium-rich non-stoichiometric titanium sulfide at an annealing temperature between about 400° and 600°C. in an atmosphere having a sulfur partial pressure substantially equal to the equilibrium sulfur partial pressure over titanium disulfide at the annealing temperature whereby the sulfur content of the finely divided titanium-rich, non-stoichiometric titanium disulfide is increased to form substantially stoichiometric titanium disulfide which corresponds to the formula $Ti_yS_2$, wherein $y$ is a numerical value between about 1.00 and 1.02 and having a particle size distribution of about 100% less than about 2 microns and about 100% greater than about 0.1 micron.

2. The process as described in claim 1 wherein the sulfur content of the non-stoichiometric titanium disulfide is increased sufficiently during annealing to form substantially stoichiometric titanium disulfide which corresponds to the formula $Ti_yS_2$ wherein y is a numerical value between about 1.00 and 1.01.

3. The process as described in claim 1 wherein the metallic titanium is titanium wire.

4. The process as described in claim 1 wherein the metallic titanium is titanium sponge.

5. The process as described in claim 1 wherein the metallic titanium is titanium sheet.

6. The process as described in claim 1 wherein the reaction temperature is between about 450° and 800°C.

7. The process as described in claim 6 wherein the titanium metal and the elemental sulfur are placed in a reaction vessel which is then evacuated, sealed and then uniformly heated to the reaction temperature to form titanium-rich titanium disulfide and the sulfur content of the titanium-rich titanium disulfide is adjusted by annealing in an atmosphere having a sulfur partial pressure substantially equal to the sulfur partial pressure over titanium disulfide at the annealing temperature.

8. The process as described in claim 6 wherein the metallic titanium and substantially stoichiometric amounts of elemental sulfur are placed in a reaction vessel which is evacuated and then sealed and the sealed reaction vessel is differentially heated to the reaction temperature to establish a hot zone in which the titanium is located and a cooler zone which controls the sulfur partial pressure which in turn controls the rate and completeness of the formation of the titanium-rich titanium disulfide.

9. The process as described in claim 8 wherein the cooler zone is held between about 100° and 200°C.

10. The process as described in claim 8 wherein the reaction vessel is heated to the reaction temperature at a rate between about 100° and 500°C. per hour.

11. The process as described in claim 8 wherein after the titanium-rich titanium disulfide is formed the temperature of the entire reaction vessel is maintained at the annealing temperature.

* * * * *